US008607572B2

(12) United States Patent
Koizumi et al.

(10) Patent No.: US 8,607,572 B2
(45) Date of Patent: Dec. 17, 2013

(54) LOW NOX COMBUSTOR FOR HYDROGEN-CONTAINING FUEL AND ITS OPERATION

(75) Inventors: Hiromi Koizumi, Hitachi (JP); Satoshi Dodo, Kasama (JP); Hirokazu Takahashi, Hitachinaka (JP); Tomohiro Asai, Mito (JP); Tomomi Koganezawa, Tokai (JP); Shohei Yoshida, Hitachiohta (JP)

(73) Assignee: Hitachi, Ltd., Chiyoda-ku, Tokyo (JP)

( * ) Notice: Subject to any disclaimer, the term of this patent is extended or adjusted under 35 U.S.C. 154(b) by 491 days.

(21) Appl. No.: 12/857,265

(22) Filed: Aug. 16, 2010

(65) Prior Publication Data
US 2011/0094239 A1    Apr. 28, 2011

(30) Foreign Application Priority Data

Sep. 30, 2009    (JP) .................................. 2009-225896

(51) Int. Cl.
*F02C 1/00* (2006.01)
*F02G 3/00* (2006.01)

(52) U.S. Cl.
USPC .............. 60/746; 60/39.463; 60/733; 60/742; 60/791; 60/39.461; 60/750; 60/752; 60/756; 60/757; 60/776

(58) Field of Classification Search
USPC ......... 60/752–760, 791, 39.461, 39.463, 733, 60/742
See application file for complete search history.

(56) References Cited

U.S. PATENT DOCUMENTS 5,582,029 A * 12/1996 Occhialini et al. .............. 62/636
5,784,875 A *  7/1998 Statler ............................ 60/775
(Continued)

FOREIGN PATENT DOCUMENTS

CN    1884910 A    12/2006
CN  101334175 A    12/2008
(Continued)

OTHER PUBLICATIONS

Japanese Office Action including partial English language translation dated Dec. 20, 2011 (Seven (7) pages).
Chinese Office Action mailed Nov. 1, 2012 and English Translation.

*Primary Examiner* — Gerald L Sung
*Assistant Examiner* — Craig Kim
(74) *Attorney, Agent, or Firm* — Crowell & Moring LLP

(57) ABSTRACT

An object of the present invention is to provide a gas turbine combustor that supports hydrogen-containing gas having a high burning velocity and is capable of performing low NOx combustion without reducing reliability of a burner. A first fuel nozzle is provided upstream of a combustion chamber and supplies fuel for activation and hydrogen-containing gas. The combustor has a primary combustion zone, a reduction zone and a secondary combustion zone. In the primary combustion zone, the fuel supplied from the first fuel nozzle is combusted under a fuel rich condition to form a burned gas containing a low concentration of oxygen. In the reduction zone, a hydrogen-containing gas is injected into the combustion chamber through a second fuel injection hole from a second fuel nozzle so that NOx generated in the primary combustion zone is reduced by an oxygen reaction of the hydrogen. In the secondary combustion zone, air for lean combustion is supplied into the combustion chamber so that unburned part of fuel is combusted under a fuel lean condition.

12 Claims, 11 Drawing Sheets

(56) References Cited

U.S. PATENT DOCUMENTS

2005/0072137 A1* 4/2005 Hokari et al. ............ 60/39.461
2006/0266040 A1* 11/2006 Haberberger et al. .......... 60/645
2007/0003897 A1 1/2007 Koizumi et al.
2007/0256416 A1 11/2007 Dodo et al.
2008/0236168 A1* 10/2008 Carroni et al. .................. 60/775
2009/0293444 A1* 12/2009 Stuttaford ................... 60/39.12
2010/0212323 A1* 8/2010 Martin ........................... 60/752

FOREIGN PATENT DOCUMENTS

| JP | 8-210641 A | 8/1996 |
| JP | 2000-130183 A | 5/2000 |
| JP | 2000-130757 A | 5/2000 |
| JP | 2002-61517 A | 2/2002 |

* cited by examiner

CROSS SECTION TAKEN
ALONG LINE X-X OF FIG. 1

62b(63b)

12a
302  303

CROSS SECTION TAKEN ALONG LINE X-X OF FIG. 7

CROSS SECTION TAKEN
ALONG LINE X-X OF FIG. 11

LOW NOX COMBUSTOR FOR HYDROGEN-CONTAINING FUEL AND ITS OPERATION

BACKGROUND OF THE INVENTION

1. Field of the Invention

The present invention relates to a combustor that supports an operation with a hydrogen-containing gas, and a method for operating the combustor while suppressing NOx emission.

2. Description of the Related Art

Fuel rich-lean combustion based on a diffusive combustion system is one of methods for suppressing NOx emission while ensuring reliability of a burner. The fuel rich-lean combustion is performed in such a manner that fuel is supplied through a single system. In operation, the fuel is supplied to a primary combustion zone provided at a head portion of the combustor and is then burned (fuel rich combustion) under a fuel rich condition so that an increase in the flame temperature is suppressed, thereby suppressing generation of NOx. Next, unburned fuel from the primary combustion zone flows down into a secondary combustion zone provided downstream of the combustor. Then, the unburned fuel is supplied with air in the secondary combustion zone, where the unburned fuel and the air are rapidly burned (fuel lean combustion) under a fuel lean condition.

However, since a flame is formed long in the primary combustion zone, it is necessary to cool the liner wall surface of a combustion chamber. Although air can be used to cool the liner wall surface of the combustion chamber, such an air supply will lead to an increase in the concentration of oxygen. With an increase in the concentration of oxygen, the flame temperature becomes high. Thus, NOx emission may be increased.

To avoid this, a technique for supplying fuel through two fuel systems has been disclosed in JP-8-210641-A. In this publication, fuel is supplied in the direction of the axis of the combustion chamber so that the flame length in the primary combustion zone is appropriately controlled.

SUMMARY OF THE INVENTION

The combustor described in JP-8-210641-A has a reheating burner provided downstream of a lean combustion burner. JP-8-210641-A supplies fuel through the two systems into the combustion chamber in the axial direction to thereby control the flame temperature in the axial direction so as to be equal to or lower than any set value.

However, the burner located at a head portion of the combustor is a premixed combustion burner that burns fuel under a fuel lean condition. When a hydrogen-containing gas, which has a high burning velocity, is used for the premixed combustion burner, since a flame is formed too close to the burner, the burner will probably be damaged by the flame. On the other hand, if the premixed combustion burner is replaced with a diffusive combustion burner in order to ensure reliability of the burner, then the temperature of a flame is locally increased during a diffusive combustion and NOx is generated, which may result in an insufficient reduction of NOx emission.

An object of the present invention is to provide a combustor that allows for a low NOx operation with a hydrogen-containing gas while ensuring reliability of a burner.

According to the present invention, a combustor comprises a combustion chamber that burns fuel with air; and a first fuel nozzle that supplies the fuel into the combustion chamber from upstream of the combustion chamber; wherein the combustor includes a second fuel injection hole formed in a liner wall surface of the combustion chamber, the second fuel injection hole being used to supply a hydrogen-containing gas into the combustion chamber.

The present invention provides the combustor that ensures reliability for a hydrogen-containing gas and a method for operating the combustor while suppressing NOx emission.

DESCRIPTION OF THE PREFERRED EMBODIMENTS

Figure 1:
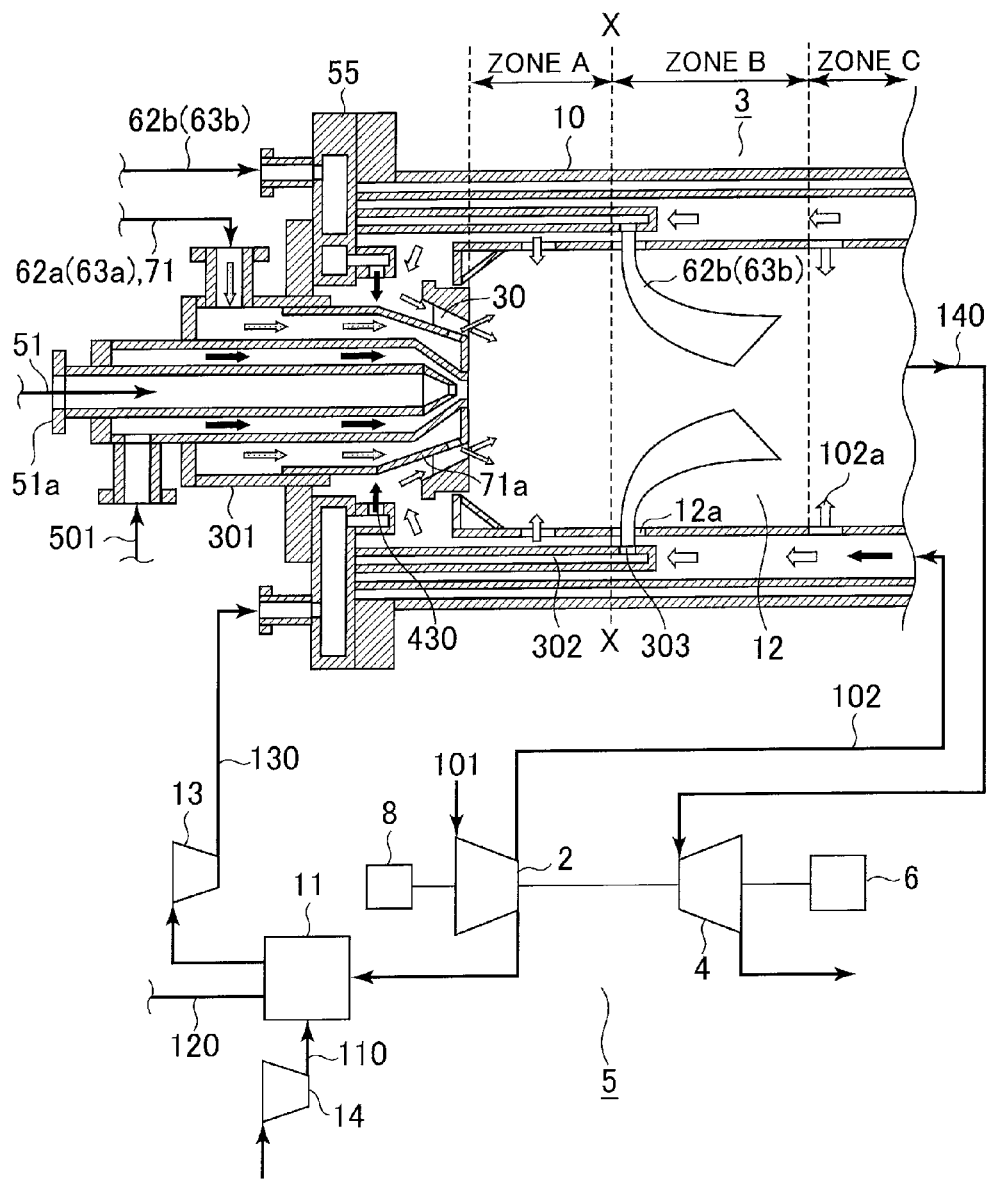
FIG. 1 is a diagram showing the structure of a combustor according to a first embodiment of the present invention.

Carbon dioxide ($CO_2$) is not generated when hydrogen is burned. Thus, hydrogen is fuel that contributes to prevention of global warming. In recent years, from the perspective of effective use of resources, an off gas containing hydrogen has been considered to be used for gas turbines as an alternative fuel to liquefied natural gas (LNG) that is main fuel for gas turbine. The off gas containing hydrogen includes: coke oven gas (COG) that is generated in a coke oven when coke is produced in a steel plant; and an off gas that is generated in an oil refinery plant. Gasification gas that is obtained by gasifying coal or heavy oil with oxygen is also fuel containing hydrogen.

An integrated coal gasification combined cycle (IGCC) system that generates electric power using fuel obtained by gasifying coal with oxygen is a power generation system that effectively uses diversified resources. Such IGCC systems have been put into practical use mainly in Europe and the US. In recent years, from the perspective of prevention of global warming, a carbon dioxide capture and storage (CCS) system that separates and removes carbon components from fuel has been considered. When carbon components are removed from fuel by the CCS system, the proportion of hydrogen components among all components of the fuel is increased. The CCS system has been considered to be applied to IGCC systems and other power generation systems.

Typical fuel compositions of coal gasification gas are carbon monoxide, hydrogen, nitrogen, and methane. The concentration of each of the compositions slightly varies depending on the coal type of a raw material and the like. The concentration of hydrogen contained in the fuel is significantly affected by operational conditions of the CCS system. Before $CO_2$, is collected by the CCS system, the concentration of hydrogen contained in coal gasification gas is approximately 25, vol. %. On the other hand, After $CO_2$, is collected at a high rate (of 90%) by the CCS system, the concentration of hydrogen contained in the coal gasification gas is approximately 85, vol. % and the coal gasification gas is fuel containing a high concentration of hydrogen.

As described above, the proportions of compositions of the fuel that is used in the IGCC plant vary depending on the coal type, a load applied to a gasifier and operational conditions of the CCS system. Thus, a combustor needs to support variations in the proportions of the compositions of the fuel. Fuel, from which $CO_2$, is separated and collected by the CCS system, has a high hydrogen concentration. Thus, the combustor needs to deal with subjects, such as a large flammable region and a high burning velocity, specific to hydrogen.

Methods for combusting fuel include a premixed combustion method and a diffusive combustion method. In the premixed combustion method, fuel and air are premixed with each other and combusted under a fuel lean condition so that the amount of NOx is reduced. However, a flame easily approaches a burner during the combustion, and reliability of the burner may be reduced due to an increase of the risk that flashback occurs. When the premixed combustion method is performed, it is important to ensure the reliability of the burner.

In the diffusive combustion method, fuel and air are supplied to a combustion chamber through different paths and combusted in the combustion chamber. In this case, after the fuel is supplied into the combustion chamber, the fuel is mixed with the air and combusted. Thus, the occurrence of flashback can be suppressed and reliability of the burner can be ensured. However, the ratio of the amount of the fuel to the amount of the air varies depending on the region in the combustion chamber. Thus, the temperature of a local flame is high in a region in which the ratio of the amount of the fuel to the amount of the air is high. As a result, NOx emission is increased. To avoid this, there is a technique for injecting nitrogen generated in an air separation unit into the combustor and reducing the temperature of the local flame. However, when heat recovery is actively performed in order to improve the efficiency of a plant, the nitrogen temperature and the fuel temperature generated in the plant are increased. Thus, a sufficient cooling efficiency cannot be easily obtained with nitrogen that has a high temperature.

Therefore, it is difficult to satisfy an amount of environmental regulation for NOx emission by a combination of the diffusive combustion method with the nitrogen injection only. It is necessary to take additional measures such as steam injection. If the steam injection is performed, it is necessary to inject high-pressure steam. For example, it is considered that steam is used to drive a steam turbine that is provided with another turbine. In this case, however, work that can be originally obtained by the steam turbine cannot be obtained. Due to this, the efficiency of the entire plant is reduced. Therefore, another method that suppresses NOx emission is desired.

Fuel generated in the IGCC plant is medium BTU gas with a lower heating value of approximately 10 $MJ/m^3$. The medium BTU gas has a high flame temperature compared with LNG that is general high BTU fuel. Thus, it is necessary to take measures to further reduce NOx emission.

The following describes embodiments of the present invention with reference to the accompanying drawings. In the embodiments, NOx emission can be reduced.

[First Embodiment]

Figure 6:
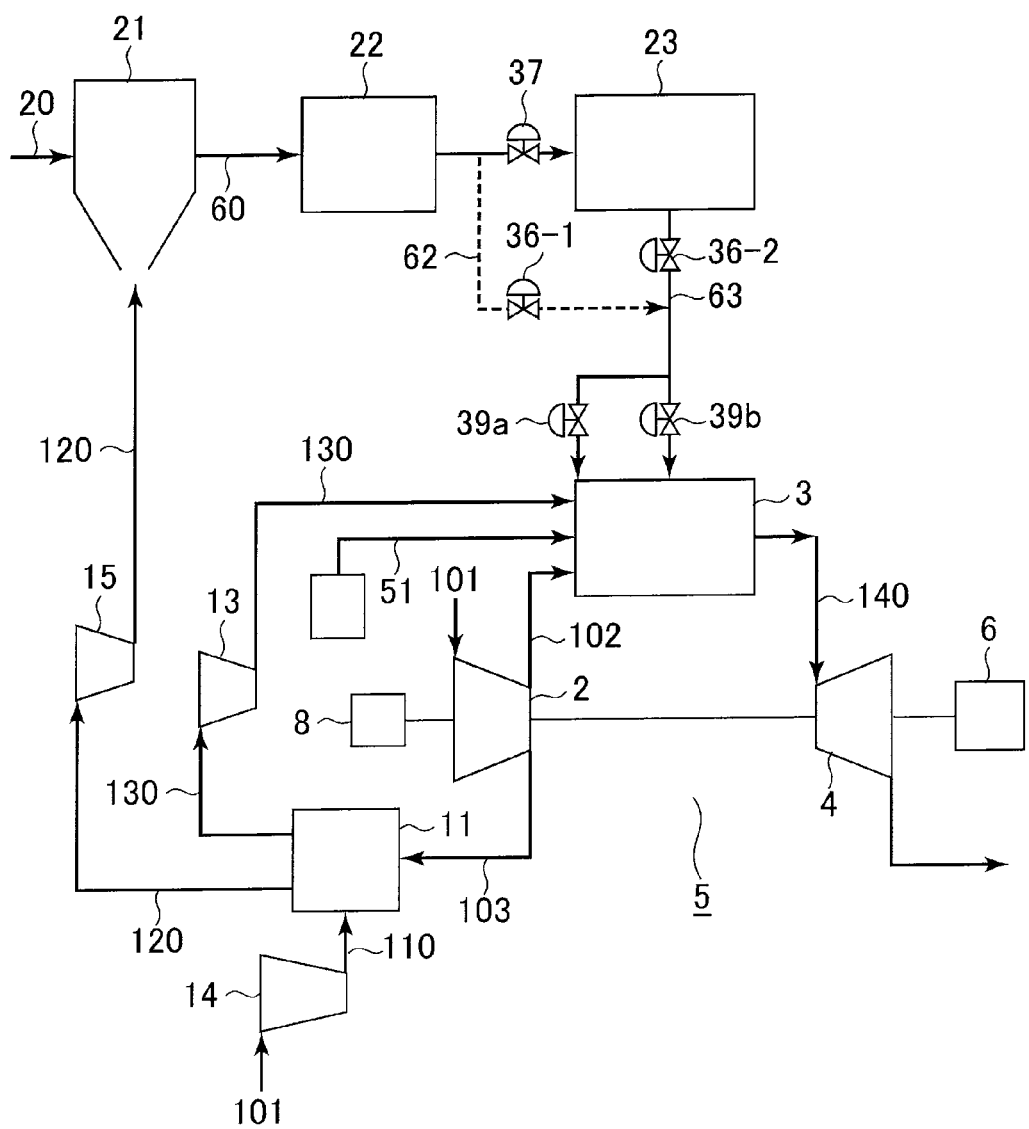
FIG. 6 is an outline diagram showing a system of a power plant according to the first embodiment.

The first embodiment describes an integrated coal gasification combined cycle (IGCC) plant. FIG. 6 shows the outline configuration of a system of the IGCC plant according to the first embodiment.

(Configuration and System of IGCC Plant)

As shown in FIG. 6, the IGCC plant according to the present embodiment includes a gasifier 21, a clean-up unit 22, a $CO_2$, capture and storage unit 23, a gas turbine 5, and an air separation unit 11. In the gasifier 21, coal gasification gas 60 is generated by a reaction of coal 20 with oxygen 120. In the clean-up unit 22, impure substances contained in the fuel are removed by desulfurization and dust removal. Thus, the coal gasification gas 60 is cleaned to form clean coal gasification gas 62.

The clean-up unit 22 supplies the coal gasification gas 62 to the $CO_2$, capture and storage unit 23 through one of the systems from an outlet of the clean-up unit 22, and supplies the coal gasification gas 62 from which $CO_2$, is not collected, to the gas turbine 5 through the other of the systems from the outlet of the clean-up unit 22. A fuel control valve 37 is provided on the side of an inlet of the $CO_2$, capture and storage unit 23. The fuel control valve 37 collects $CO_2$, and controls the flow rate of the coal gasification gas 62. Thus, the flow rate of the coal gasification gas 62 that is to be supplied to the $CO_2$ capture and storage unit 23 can be controlled by the fuel control valve 37.

A control valve 36-1 is provided on the side of an outlet of the $CO_2$, capture and storage unit 23. The control valve 36-1 controls supply of coal gasification gas 63 (fuel containing a high concentration of hydrogen) from which $CO_2$ is collected. Also, the control valve 36-1 controls the pressure of the coal gasification gas 63. Furthermore, the control valve 36-1 blocks the supply of the coal gasification gas 63 if an emergency arises. A control valve 36-2 is provided in a system through which the coal gasification gas 62 from which $CO_2$, is not collected is supplied to gas turbine 5. The aforementioned two systems join together on the downstream sides of the control valves 36-1 and 36-2 that are provided in the two systems, respectively. Fuel control valves 39a, and 39b, are provided on the downstream side of the point at which the two systems join together. The fuel control valves 39a, and 39b, control the flow rate of the coal gasification gas that is to be supplied to the gas turbine 5. A load that is applied to the gas turbine 5 can be changed by controlling the flow rate of the coal gasification gas that is to be supplied to the gas turbine 5, by means of the fuel control valves 39a and 39b.

Since one of the two branched systems, which does not extend through the $CO_2$, capture and storage unit 23, is used, the coal gasification gas 62 from which $CO_2$, is not collected can be directly supplied to the gas turbine 5. The gas turbine 5 generates thermal energy due to the combustion of the coal gasification gas 62. A turbine 4 is capable of converting the thermal energy into rotational energy and transmitting power to a power generator 6. Thus, the power generator 6 can generate electric power.

The coal gasification gas 62 is supplied to the $CO_2$ capture and storage unit 23 through the other of the branched two systems. In the $CO_2$, capture and storage unit 23, CO contained in the coal gasification gas 62 is converted into $CO_2$, by a shift reaction of the coal gasification gas with steam. In addition, hydrogen is generated by the reaction. The generated $CO_2$, is separated and collected. Then, the coal gasification gas 63 from which the $CO_2$, is collected can be supplied to a combustor 3. The concentration of hydrogen in the fuel is increased by increasing the $CO_2$, capture rate. The proportions of the compositions of the fuel that is to be supplied to the combustor 3 before the operation of the $CO_2$, capture and storage unit 23 are significantly different from the proportions of the compositions of the fuel that is to be supplied to the combustor 3 after the operation of the $CO_2$ capture and storage unit 23.

With the increase in the $CO_2$, capture rate, the content rate of hydrogen in the fuel is increased. Thus, the fuel having a high burning velocity is supplied to the combustor 3. In the present embodiment, when the $CO_2$, capture and storage unit 23 starts operating during the supply of the coal gasification gas 62 that has passed through the clean-up unit 22 to the gas turbine 5, the content rate of hydrogen in the coal gasification gas supplied to the combustor 3 is gradually increased. With the increase in the content rate of hydrogen in the coal gasification gas, the burning velocity is increased. In the premixed combustion method, the probability of the occurrence of flashback may be increased and reliability of a burner may be reduced.

In the plant, it is considered that the operation of the $CO_2$, capture and storage unit 23 is suddenly stopped for some reasons. In this case, the content rate of hydrogen in the fuel is rapidly reduced from that as observed while the state in which the $CO_2$, capture and storage unit 23 operates. Thus, the burning velocity of the supplied fuel is reduced, and blowout of a flame and the like occurs. Thus, the combustor needs to support a wide range of the content rate of hydrogen in order to support a variation in the burning velocity.

Bleed air 103 can be supplied from a compressor 2 included in the gas turbine 5 to the air separation unit 11 that separates air into nitrogen and oxygen. In addition, discharged air 110 can be supplied from a backup air compressor 14 to the air separation unit 11. Since the discharged air 110 is supplied to the air separation unit 11 from the backup air compressor 14, the air separation unit 11 can supply the oxygen 120 necessary for the gasifier 21 before activation of the gas turbine 5.

The gas turbine 5 is activated by means of liquid fuel 51 for activation. When the bleed air 103 can be supplied from the gas turbine 5 to the air separation unit 11, the flow rate of the air 110 discharged from the backup air compressor 14 can be reduced by increasing the flow rate of the bleed air 103. The pressure of the oxygen 120 that is generated in the air separation unit 11 is increased by an oxygen pressure increasing compressor 15. After that, the oxygen is supplied to the gasifier 21. On the other hand, nitrogen 130 is generated during the separation of the air. The pressure of the generated nitrogen 130 is increased by a nitrogen pressure increasing compressor 13. After that, the nitrogen 130 is supplied to the gas turbine combustor 3.

In addition, the $CO_2$, that should have been generated by the combustion of the fuel can be collected in advance by the operation of the $CO_2$, capture and storage unit 23 that uses a shift reaction. Thus, the amount of $CO_2$, emission can be reduced. Furthermore, the coal gasification gas containing a high concentration of hydrogen, which is obtained after the separation and collection of $CO_2$, is supplied to second fuel nozzles. Thus, the amount of hydrogen that reduces NOx can be increased as described later. Therefore, NOx emission can be further reduced.

(System of Gas Turbine and Configuration of Combustor)

FIG. 1 is an enlarged cross sectional view of a system of the gas turbine and the combustor according to the present embodiment. The gas turbine 5 includes the compressor 2, the combustor 3, the turbine 4, the power generator 6, a start-up motor 8, and the like. In the gas turbine 5, the compressor 2 compresses air 101 sucked from the atmosphere and supplies the compressed air 102 for combustion to the combustor 3. The combustor 3 mixes the air 102 for combustion supplied from the compressor 2 with the fuel and burns the air 102 and the fuel to form burned gas 140. The liquid fuel 51 for activation, the coal gasification gas 62a, (hydrogen-containing gas) from which $CO_2$, is not collected, and the like are used as the fuel. The burned gas 140 is supplied to the turbine 4 so that torque is generated. The torque of the turbine 4 is transmitted to the compressor 2 and the power generator 6. The torque transmitted to the compressor 2 is used for compression power. The torque transmitted to the power generator 6 is converted into electric energy.

The combustor 3 includes a combustion chamber 12 provided on an inner side of an outer casing 10 that is a pressure container. In the combustion chamber 12, the air and the fuel are combusted. In the combustion chamber 12, a first fuel nozzle 301 is provided to supply the liquid fuel 51 for activation and the coal gasification gas 62a, (first fuel) to a region located on an upstream side of flow of the burned gas. In the combustor 3, second fuel injection holes 12a,, air holes and transition pieces (not shown), which are arranged in this order from the first fuel nozzle 301 to a downstream side of the flow of the burned gas. The air 102a for lean combustion is supplied through the air holes. The transition pieces are provided to guide the burned gas generated in the combustion chamber 12 to the turbine. The second fuel injection holes 12a, and the air holes through which the air 102a, for lean combustion is supplied into the combustion chamber 12 are provided in a liner wall surface of the combustion chamber 12. Second fuel nozzles 302 are arranged along an outer circumference of the combustion chamber 12. The second fuel nozzles 302 supply coal gasification gas 62b, (hydrogen-containing gas) through the second fuel injection holes 12a, into the combustion chamber 12.

The first fuel nozzle 301 includes a liquid fuel nozzle 51a, for activation, a gas nozzle 71a,, and a swirler 30. The liquid fuel nozzle 51a, for activation allows the gas turbine 5 to be activated by means of the liquid fuel. The gas nozzle 71a, extends along an outer circumference of the liquid fuel nozzle 51a, and allows the gas turbine 5 to be activated by means of gas such as LNG. The swirler 30 improves flame holding. The first fuel nozzle 301 is capable of switching the fuel from high BTU fuel (such as LNG) for activation to hydrogen-containing gas and from the liquid fuel to the hydrogen-containing gas.

A nitrogen injection nozzle 430 extends along an outer circumference of the first fuel nozzle 301. The nitrogen injection nozzle 430 injects the nitrogen 130 generated in the plant into the combustor 3. The injection of the nitrogen that is an inert gas can reduce the concentration of oxygen present in zones (zones A and B described later) located on an upstream side of the air holes through which the air 102 for lean combustion is supplied. In addition, mixing of the fuel with the air is promoted by the effect of agitating injected air. The temperature of a local flame can be reduced by the effect of agitating injected air. These effects can suppress generation of NOx in a head portion of the combustor.

The first fuel nozzle 301 includes: a flow path through which the liquid fuel 51 for activation and the coal gasification gas 62a, are supplied to the combustion chamber 12; and a flow path through which atomizing air 501 and the air 102 for combustion are supplied to the combustion chamber 12. The flow paths are separated from each other. In other words, the fuel and the air are not mixed with each other before the fuel and the air reach the combustion chamber. The burner according to the present embodiment uses a diffusive combustion system. In the burner, the fuel and the air are supplied to the combustion chamber through the different flow paths, respectively.

The burner that uses the diffusive combustion system can suppress the occurrence of flashback regardless of the burning velocity. When the combustor operates with the coal gasification gas 63 having a high burning velocity from which the $CO_2$, is separated and collected, the fuel is injected into the combustion chamber at a rate based on the low burning velocity of the coal gasification gas 62 from which the $CO_2$, is not separated and collected. Since the combustor operates in this manner, flame blowout can be prevented. Since the occurrence of flashback and flame blowout can be prevented, high reliability can be maintained even when the content rate of hydrogen contained in the fuel to be supplied is changed.

The second fuel nozzles 302 are arranged along the outer circumference of the combustion chamber 12 in the combustor 3. The second fuel 62b, is supplied through an end cover 55 to the second fuel nozzles 302. After that, the second fuel 62b, is supplied from the second fuel nozzles 302 through the second fuel injection holes 12a, provided in the liner wall surface of the combustion chamber 12 into the combustion chamber 12. Thus, it is preferable that the second fuel injection holes 12a, and fuel ejection holes 303 provided in the second fuel nozzles 302 be arranged so that the positions of the holes 12a, and 303 in the direction of the central axis of the combustor are the same and the phases of the holes 12a, and 303 in a circumferential direction of the combustor are the same.

Figure 2:
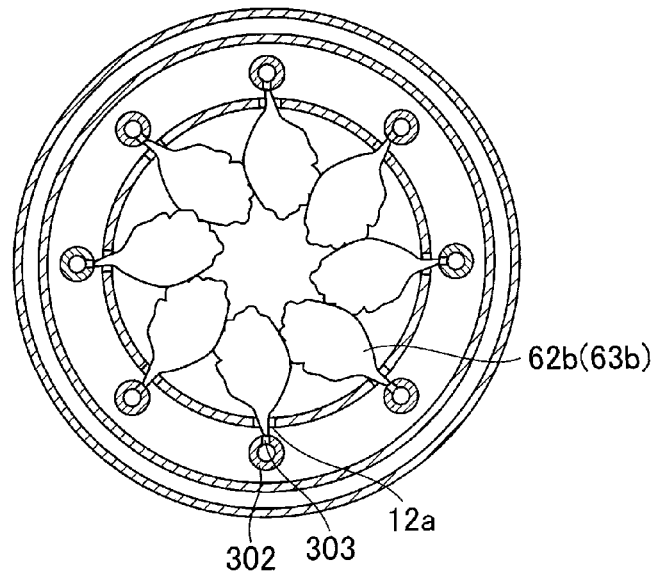
FIG. 2 is an outline cross sectional view of the combustor according to the first embodiment, taken along a line X-X of FIG. 1, the line X-X extending through second fuel injection holes provided in the combustor.

FIG. 2 is an outline cross sectional view of the combustor 3 taken along a line X-X of FIG. 1, while the line X-X extends through the fuel ejection holes 303. The second fuel nozzles 302 according to the present embodiment are 8 pencil-shaped nozzles installed to the end cover 55. Each of the second fuel nozzles 302 has a single ejection hole 303 formed in a side surface of the second fuel nozzle 302. The side surfaces of the second fuel nozzles 302 face the second fuel injection holes 12a,, respectively. The second fuel injection holes 12a, extend through the liner wall surface of the combustion chamber 12. A single tube and an annular manifold may be provided so that the tube guides the second fuel 62b, to the periphery of the second fuel injection holes 12a, and the second fuel 62b, flows through the manifold to the second fuel injection holes 12a, and is supplied to the combustion chamber 12 through the second fuel injection holes 12a.

(Concept of Low NOx Combustor)

As shown by broken lines and arrows in FIG. 1, the combustor according to the present embodiment has a primary combustion zone (zone A), a reduction zone (zone B), and a secondary combustion zone (zone C), which are arranged in this order from the upstream side of flow of the gas in the combustion chamber 12.

The zone A extends from the first fuel nozzle 301 arranged on the upstream side of the combustor to a boundary between the zones A and B that is located very close to and on the upstream side of the fuel ejection holes 303 in the axial direction of the combustor, that is, in the direction of the main flow. The zone B extends from the second fuel nozzles 302 to a boundary between the zones B and C that is located very close to and on the upstream side of the air holes through which the air 102a, for lean combustion is supplied. The zone C extends from the air supply holes through which the air 102a, for lean combustion is supplied, to an outlet of the combustion chamber 12.

In the zone A, the burned gas containing oxygen with a low concentration is generated by the combustion of the fuel supplied from the first fuel nozzle 301 and the injection of the nitrogen. Specifically, the nitrogen that is an inert gas is first injected to reduce the concentration of oxygen contained in the air 102 for combustion. Then, the air 102 containing the oxygen with the reduced concentration is injected. While the air 102 containing the oxygen with the reduced concentration is injected, the coal gasification gas is burned under a fuel rich condition to further reduce the amount of the oxygen.

The opening area of an air supply hole provided in the zone A according to the present embodiment is in a range that allows air to flow into the zone A so that a flame is maintained. The opening area of the air supply hole is relatively small. This structure suppresses inflow of an excessive amount of oxygen contained in the air 102 for combustion. Thus, while the stability of the flame is maintained, the concentration of oxygen can be sufficiently lower toward the downstream side of the zone A.

In order to ensure the reliability for the hydrogen-containing gas having a high burning velocity, the combustor 3 according to the present embodiment uses the burner that uses the diffusive combustion system, and the air and the fuel are injected into the combustion chamber from the different locations in the combustor 3. Thus, NOx is generated due to the combustion and an increase in the local flame temperature. The NOx is contained in the burned gas containing a low concentration of oxygen generated in the zone A.

However, the combustion is performed under the fuel rich condition in a similar manner to rich lean combustion that is a conventional technique. Thus, the concentration of oxygen is lower than that in typical diffusive combustion, and the increase in the local flame temperature is lower than that in the typical diffusive combustion. In addition, the injection of the nitrogen, which is described above, can suppress the increase in the flame temperature. The amount of emitted NOx is lower than the amount of NOx generated by a burner that uses a simple diffusive combustion system. The hydrogen contained in the fuel is chemical species that have the highest affinity with oxygen and have a higher reaction rate constant than the constant of the reaction in which the nitrogen is converted into thermal NOx. In other words, the oxygen reacts with the hydrogen at a higher rate than the reaction of the nitrogen with the oxygen. Thus, the amount of generated NOx is further reduced.

Next, the zone B is described. In the zone B, the NOx contained in the burned gas that is generated in the zone A and contains the low concentration of oxygen is reduced by the hydrogen contained in the fuel 62b, supplied from the second fuel nozzles 302 so that the amount of the NOx is reduced. Specifically, the hydrogen-containing gas is injected from the second fuel nozzles 302 into the burned gas containing a low concentration of oxygen that has flowed from the zone A to the downstream side in the combustion chamber. In this case, since the air for combustion flows from the second fuel injection holes into the zone B in the configuration according to the present embodiment, the concentration of oxygen present on the upstream side of the zone B is slightly increased.

The diffusion rate of the hydrogen with a low molecular weight is high. Thus, the hydrogen is diffused in the burned gas at a high rate. The temperature of the burned gas is sufficiently high for the hydrogen that reacts at a temperature of approximately 700, K. The diffused hydrogen reacts with oxygen atoms contained in the NOx generated in the zone A. The NOx (NO) is reduced in the zone B by the oxidation reaction of the hydrogen. Thus, the amount of the NOx generated in the zone A is reduced in the zone B. It should be noted that NO is reduced by the reaction expressed by the formula (1).

$$2NO+2H_2 \rightarrow N_2+2H_2O \qquad (1)$$

Carbon monoxide is also fuel that provides a reduction effect. Thus, carbon monoxide may be supplied to reduce NOx instead of the hydrogen, or carbon monoxide and hydrogen may be simultaneously supplied to reduce the NOx.

In the zone C, unburned fuel that is not burned and is contained in the gas that flows into the zone C from the zone B located on the upstream side of the zone C, is mixed with the air at a high rate, and the fuel and the air are burned. Specifically, the air 102a, for lean combustion is injected from the air holes into the zone C. The fuel that is not burned in the zones A and B is combusted (lean combustion) under a fuel lean condition. It is important to achieve sufficient penetration of the air 102a, for lean combustion. If the number of air holes is too many, the flow rate of the air 102a, that flows into the zone C from each of the air holes is reduced. When the flow rate of the air 102a, for lean combustion is low, the air 102 does not reach a central region of the combustion chamber. In this case, the air 102a, is not sufficiently mixed with the unburned fuel. The temperature of a local flame may be increased in a region in which the concentration of the unburned fuel is high, and NOx may be generated in the zone C.

In order to suppress generation of NOx in the zone C in the combustion process, it is important to mix the air 102a, for lean combustion with the unburned fuel at a high rate. In order to mix the air 102a, with the unburned fuel at a high rate, it is preferable that the air 102a, for lean combustion pass through the burned gas and flow so that the burned gas is agitated. In the present embodiment, the number of the holes through which the air 102a, for lean combustion is supplied is limited and the diameter of each of the air supply holes is large. Thus, the air 102a, passes through the burned gas and flows to agitate the burned gas so that the air 102a, is mixed with the unburned fuel at a high rate.

In order to achieve lean combustion while suppressing generation of NOx in the zone C, it is preferable that the air for lean combustion flow through the air supply holes to the periphery of the central axis of the combustor on the downstream side of the flow of the burned gas in a direction perpendicular to the axis of the combustion chamber. In this air supply method, portions of the air for lean combustion collide with each other at the periphery of the central axis of the combustor so that a stagnation region is formed at the periphery of the central axis of the combustor. The stagnation region that is an original point of the combustion reaction is far from the liner wall surface of the combustion chamber. Thus, sufficient reliability for the hydrogen-containing gas that has a high burning velocity can be ensured. In addition, since the air for lean combustion flows from different directions at the periphery of a stagnation point, a large agitating effect can be expected. Thus, the air for lean combustion can be mixed with the burned gas that flows from the zone B at a high rate.

Since the hydrogen contained in the unburned fuel is burned by the burned gas in the zone B and the molecular weight of the hydrogen is small, the hydrogen is diffused at a high rate and mixed with the air at a high rate. Thus, in the zone C, an increase in the temperature of a local flame is small. In the zone C, the temperature of the burned gas generated in the zone A is already reduced by the hydrogen-containing gas supplied into the zone B. The unburned part of fuel is burned in the zone C under the fuel lean condition and an increase in the flame temperature is small. Thus, the burned gas rapidly flows out of the combustion chamber toward the turbine. Thus, the flame temperature is maintained at a low level in the zone C. In addition, since the gas is present in the zone C for a short time, the generation of NOx is suppressed.

In general, when combustion is performed under a fuel lean condition in which the ratio of the amount of the fuel to the amount of the air is low, it is difficult to ensure the efficiency of the combustion and the flame is easily blown out. However, the average temperature of the mixture of the air for lean combustion and the fuel can be maintained at a high level in the zone C due to the enthalpy of the burned gas present in the zone B. In addition, the temperature of the unburned fuel is maintained at a high level so that the unburned fuel can reduce NOx. In other words, sufficient activation energy is provided so that stable combustion can be performed.

Figure 4:
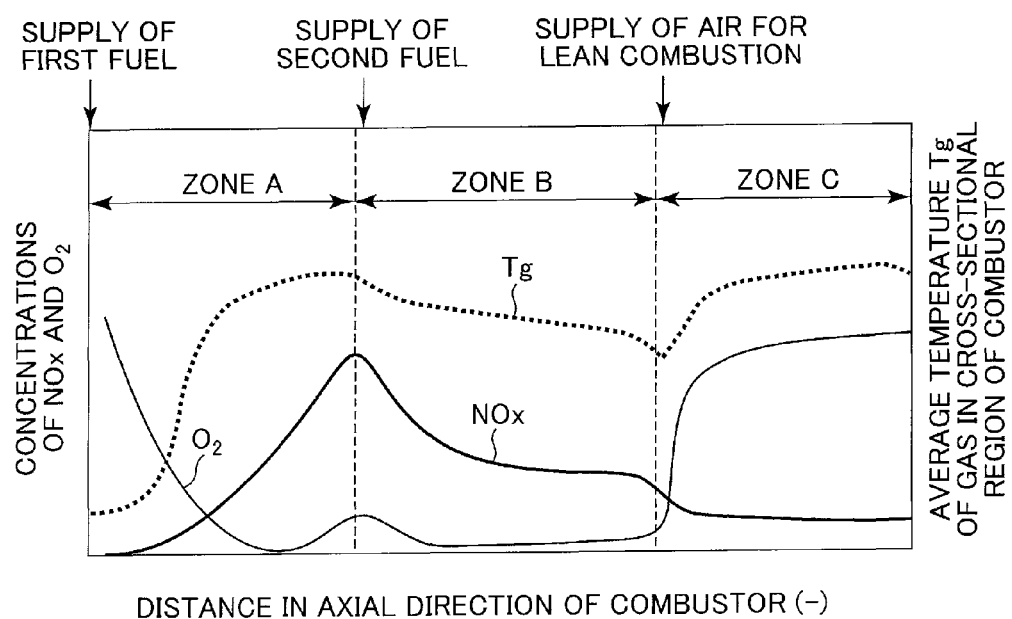
FIG. 4 is an outline diagram showing the concentration of oxygen in a combustion chamber, the concentration of NOx in the combustion chamber, and the average temperature of gas in cross-sectional regions of the combustor, with respect to a distance in an axial direction of the combustor according to the first embodiment.

FIG. 4 is a conceptual diagram showing the concentration of oxygen in the combustion chamber, the concentration of NOx in the combustion chamber, and the average temperature of the gas in cross-sectional regions of the combustor, with respect to a distance in the axial direction of the combustor. In FIG. 4, it is assumed that the gas turbine is operated under a rated load (FSFL: Full Speed Full Load) condition. When the rated load operation starts, the first fuel nozzle 301 has already switched the fuel from the liquid fuel 51 for activation to the coal gasification gas 62a. In addition, the first fuel is controlled so that the flow rate of the first fuel is constant when the increase in the gas turbine load is stopped.

Figure 5:
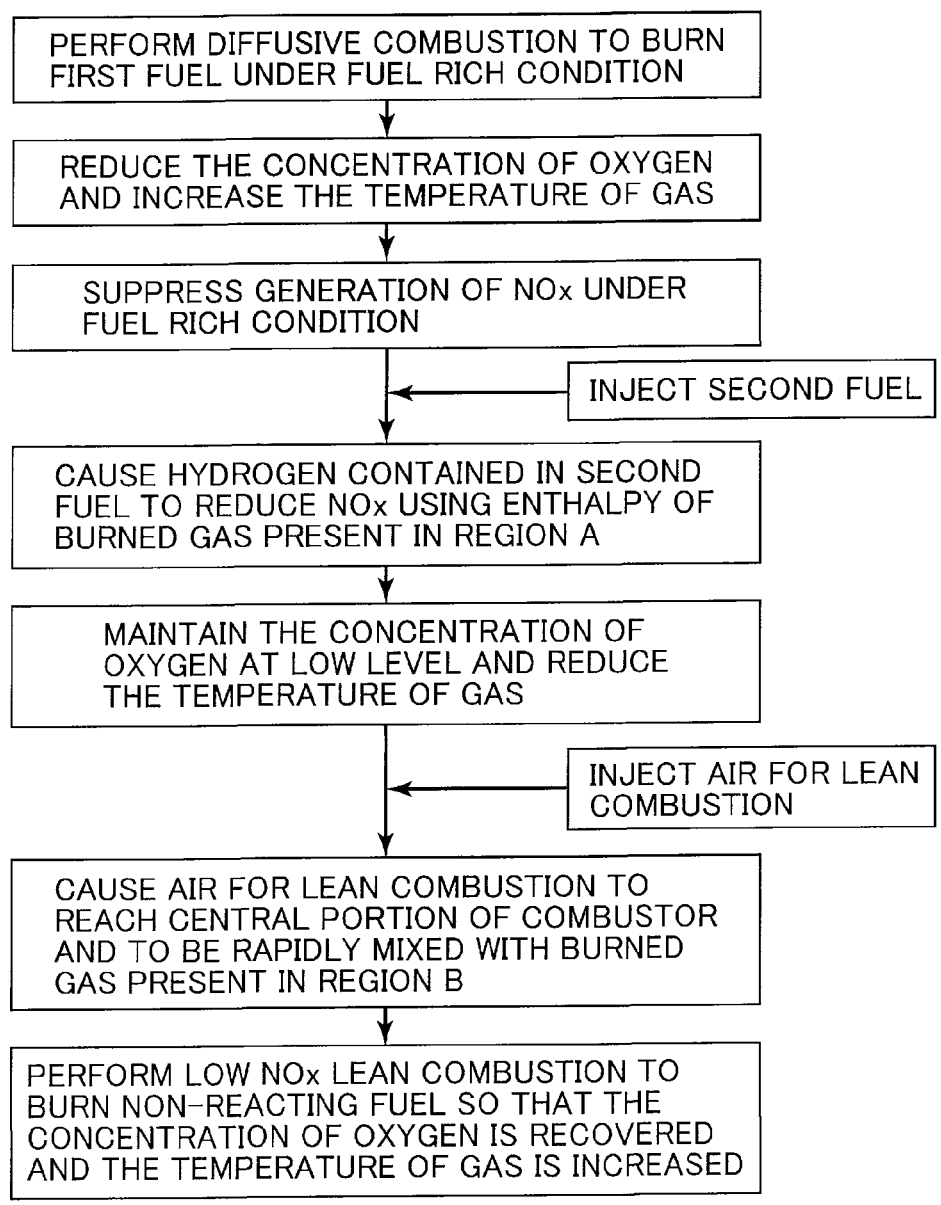
FIG. 5 is a flowchart of effects that occur in the combustor from an upstream side to a downstream side of flow of burned gas.

FIG. 5 is a flowchart of effects that occur in the combustor from the upstream side to the downstream side of the flow of the burned gas. The concentration of oxygen in each of the zones A to C, the concentration of NOx in each of the zones A to C, and the average temperature of the gas in each of cross-sectional regions of the combustor are described with reference to FIGS. 4 and 5.

In the zone A, the combustion is performed by the diffusive combustion system to burn the first fuel supplied from the first fuel nozzle 301. In this case, since the combustion progresses in the zone A under the fuel rich condition, the concentration of oxygen in the zone A is reduced at a high rate as the reaction of the oxygen progresses. In the zone A, the average temperature of the gas in a cross-sectional region of the combustor is also increased at a high rate. The concentration of NOx is increased with some delay period after the reduction of the oxygen concentration and the increase in the average temperature of the gas, since the nitrogen oxide needs to be present in the zone A for a certain time until the nitrogen oxide is immobilized. Since the combustion is performed under the fuel rich condition, an increase in the flame temperature can be suppressed. In addition, although NOx is generated, the amount of the generated NOx is suppressed compared with simple diffusive combustion.

The second fuel containing hydrogen is supplied into the zone B. The reduction of the NOx is promoted by the supply of the second fuel. Thus, the concentration of the NOx is gradually reduced. In the present embodiment, since the second fuel is supplied into the combustion chamber through the air supply holes, the fuel and the air simultaneously flow into the zone B. This results in the concentration of the oxygen being increased when the second fuel is supplied. When the fuel ejection holes of the second fuel nozzles are directly formed in the liner wall surface of the combustion chamber, this structure can prevent air from flowing into the zone B. Thus, the concentration of oxygen in the zone B can be maintained at a low level. In this case, the fuel ejection holes of the second fuel nozzles also serve as the second fuel injection holes.

A part of the air leaks into the zone B according to the present embodiment so that the concentration of oxygen in the zone B is slightly increased. However, air is not actively supplied into the zone B. The amount of oxygen is too small to sufficiently burn the fuel in the zone B. Thus, most of the second fuel is not burned in the zone B. The concentration of oxygen is maintained at a low level in the zone B. The temperature of the gas in the zone B is reduced by the supply of the second fuel. The enthalpy of the burned gas generated on the upstream side is used as the activation energy that causes the hydrogen to reduce NOx. Thus, the temperature of the gas in the combustor is gradually reduced.

When sufficient activation energy is provided, the amount of NOx reduced by hydrogen contained in the second fuel is in proportion to the concentration of the hydrogen. Thus, it is effective to set the ratio of the amount of the second fuel to the amount of the first fuel to be high in order to reduce the amount of NOx. In order to ensure the activation energy for the reduction reaction using the second fuel, it is necessary that the average temperature of a complete mixture of the burned gas flowing from the zone A and the fluid supplied from the second fuel injection holes 12a be 700° C. or higher at which the hydrogen starts to react. Thus, it is preferable that the ratio of the flow rate of the first fuel to be supplied to the flow rate of the second fuel to be supplied be controlled so that the temperature of the gas in the zone B is 700° C. or higher.

In the zone C, the concentration of oxygen is increased by the supply of the air for lean combustion, and NOx is attenuated by air so that the concentration of the NOx is reduced. The temperature of the gas in the combustor is temporarily reduced due to the air for lean combustion that has flowed into the zone C. However, the unburned fuel, which is not burned in the zones A and B due to a lack of oxygen, is rapidly burned in the zone C. Thus, the temperature of the gas in the combustor is increased. In this case, the unburned fuel is burned in the zone C under a fuel lean condition in which the ratio of the amount of the fuel to the amount of the air is low, after the supply of the air for lean combustion with a sufficient amount into the zone C. Then, the burned gas that is formed in the zone C flows into an inlet of the turbine. The burned gas is then expanded in an adiabatic manner. Then, the temperature of the burned gas is reduced. The time period from the time when the burned gas is formed to the time when the temperature of the burned gas is reduced is shorter than time periods for which the burned gas is present in the other zones. The proportion of the amount of immobilized NOx among the amount of the NOx present in the zone C is small. In the zone C, generation of NOx can be suppressed so very little NOx is generated.

As described above, the combustor according to the present embodiment has the following feature. That is, the combustor has the reduction zone (zone B) between the primary combustion zone (zone A) and the secondary combustion zone (zone C). In the zone A, the diffusive combustion is performed under the fuel rich condition. In the zone C, the unburned fuel is completely burned. In the zone B, NOx (NO) is reduced by the injection of the hydrogen-containing gas. The NOx generated in the zone A in which the diffusive combustion is performed is reduced in the zone B. Thus, the amount of emitted NOx can be reduced compared with conventional rich-lean combustion. Thus, the gas turbine combustor for hydrogen-containing gas, in which low NOx combustion can be performed, can be provided while the reliability of the burner is ensured by the diffusive combustion system.

According to the present embodiment, since the coal gasification gas that is the hydrogen-containing gas is supplied to the gas turbine combustor that supports the hydrogen-containing gas, the low NOx IGCC plant can be provided, which enhances the features of the combustor.

(Operation Schedule)

Figure 3:
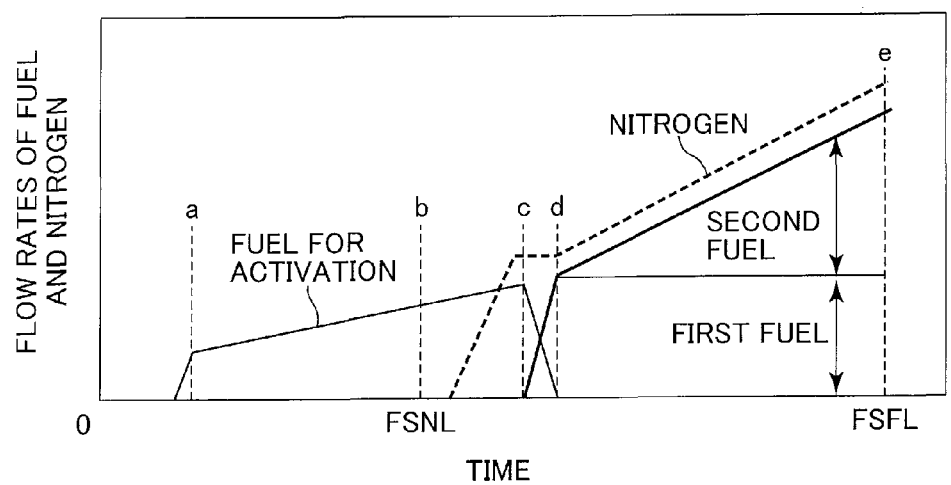
FIG. 3 is a diagram showing the flow rate of injected fuel and the flow rate of injected nitrogen, with respect to a gas turbine load according to the first embodiment.

An operation schedule of the IGCC plant, which is based on an operation schedule shown in FIG. 3, is described as an example. When the IGCC plant starts operating, the gas turbine is driven by external power such as the start-up motor 8. When the rotational rate of the gas turbine is maintained at a constant level that corresponds to ignition conditions of the combustor, the air 102 for combustion, which is necessary for ignition, is supplied to the combustor and the ignition conditions are satisfied. When the ignition conditions are satisfied, the liquid fuel 51 for activation is supplied to the liquid fuel nozzle 51a, for activation and ignited in the combustor 3.

After that, the burned gas 140 is supplied to the turbine 4. As the flow rate of the liquid fuel 51 is increased, the rotational rate of the turbine 4 is increased. When the start-up motor 8 is detached, the gas turbine independently operates and the rotational rate of the gas turbine reaches a no-load rated rotational rate (FSNL: Full Speed No Load).

After the rotational rate of the gas turbine reaches the no-load rated rotational rate, the load is increased by a parallel operation of the power generator 6 and an increase in the temperature of the gas present at the inlet of the turbine 4 due to the increase in the amount of the liquid fuel 51. After the load is increased by the parallel operation, the air 103 that is necessary for the air separation unit 11 is injected by the gas turbine. Thus, oxygen necessary for the gasifier and nitrogen 130 generated during the air separation can be supplied to the gas turbine combustor 3. The air necessary for the air separation unit 11 can be also supplied from the backup air compressor 14. The oxygen 120 is supplied from the air separation unit 11 to the gasifier. Thus, the gasifier can be operated before the activation of the gas turbine.

When coal gas can be supplied by an increase in a load applied to the gasifier, the combustor changes liquid fuel combustion to coal gas combustion in order to combust the fuel. The operation for changing fuel combustion is performed under an almost constant load condition. The combustor increases the flow rate of the coal gasification gas 62a, (first fuel) on the basis of a reduction in the flow rate of the liquid fuel 51 to be supplied from the first fuel nozzle 301 so that only the gas is combusted in the combustor. After the combustor is set so that only the gas is combusted, the flow rate of the coal gasification gas 62b (second fuel) that is supplied from the second fuel nozzles is increased so that the load that is applied to the gas turbine is increased. Then, the gas turbine is operated under the rated load (FSFL).

FIG. 3 shows a schedule of these operations. FIG. 3 also shows the rotational rate of the gas turbine. In addition, FIG. 3 shows a change in the flow rate of the liquid fuel 51, a change in the flow rate of the gas fuel 62, and a change in the flow rate of nitrogen generated in the plant, with respect to the gas turbine load. FIG. 3 shows the changes in the flow rates of the first and second fuel among the flow rates of all fuel supplied to the combustor. In FIG. 3, a, b, c, d,, and e, indicate:
a) the time when the liquid fuel for activation is ignited;
b) the time when the rotational rate of the gas turbine reaches the no-load rated rotational rate (FSNL);
c) the time when the fuel switching operation is started;
d) the time when the fuel switching operation is ended; and
e) the time when the gas turbine is operated under the rated load (FSFL).

For the time period from the time a to the time c, the liquid fuel (oil) for activation is burned. For the time period from the time c to the time d, the fuel for activation and the gas fuel are burned. For the time period from the time d to the time e, only the gas is burned.

First, the liquid fuel 51 for activation is ignited, and the rotational rate of the gas turbine is increased by the increase in the flow rate of the fuel. When the rotational rate of the gas turbine reaches the no-load rated rotational rate (FSNL), the nitrogen 130 can be supplied to the gas turbine. After the gas turbine is set so that the nitrogen 130 can be supplied to the combustor, air can be injected into the air separation unit in response to the increase in the gas turbine load. The flow rate of air that can be injected is almost proportional to the change in the load.

After that, the gasification gas can be supplied. Then, the liquid fuel combustion can be switched to the gas combustion in the gas turbine (at the time c). During the operation for switching the fuel (or during the time period from the time c to the time d), in order to ensure stability of the combustion, the flow rate of nitrogen that is injected is almost constant under an almost constant load condition. With the reduction in the flow rate of the liquid fuel 51 and the increase in the flow rate of the gas fuel 62a, the combustion is switched to the combustion of only the gas (at the time d).

After the combustion is switched to the combustion of only the gas, the flow rates of the first and second fuel that is supplied through the first and second fuel supply systems can be controlled. Thus, the temperature of the burned gas in the combustion chamber can be adjusted by controlling the flow rates of the first and second fuel. In addition, the flow rate of the hydrogen-containing gas to be supplied from the second fuel nozzles is adjusted on the basis of the content rate of hydrogen contained in the supplied fuel and the amount of generated NOx so that the NOx is sufficiently reduced in the zone B.

The present embodiment describes an example of the low NOx combustion that is performed when the flow rate of the first fuel is controlled to be constant, and the flow rate of the second fuel is increased in response to the increase in the gas turbine load. In order to suppress NOx emission, the flow rates of the first and second fuel can be simultaneously changed to control the load that is applied to the gas turbine. In the present embodiment, the coal gasification gas 62 from which $CO_2$, is not collected is supplied to the first and second fuel nozzles as the coal gasification gas 62a, and 62b, and used as the fuel. The coal gasification gas 63 from which $CO_2$, is collected is supplied to the first and second fuel nozzles as coal gasification gas 63a, and 63b, and used as the fuel. In this case, since the concentration of hydrogen in the fuel is increased, the efficiency of the reducing the NOx in the zone B can be improved.

[Second Embodiment]

The first embodiment describes the example of the IGCC plant. The second embodiment describes an example of an operation of a power plant that uses COG as fuel. The COG is generated when coke is formed in a steel plant.

Figure 10:
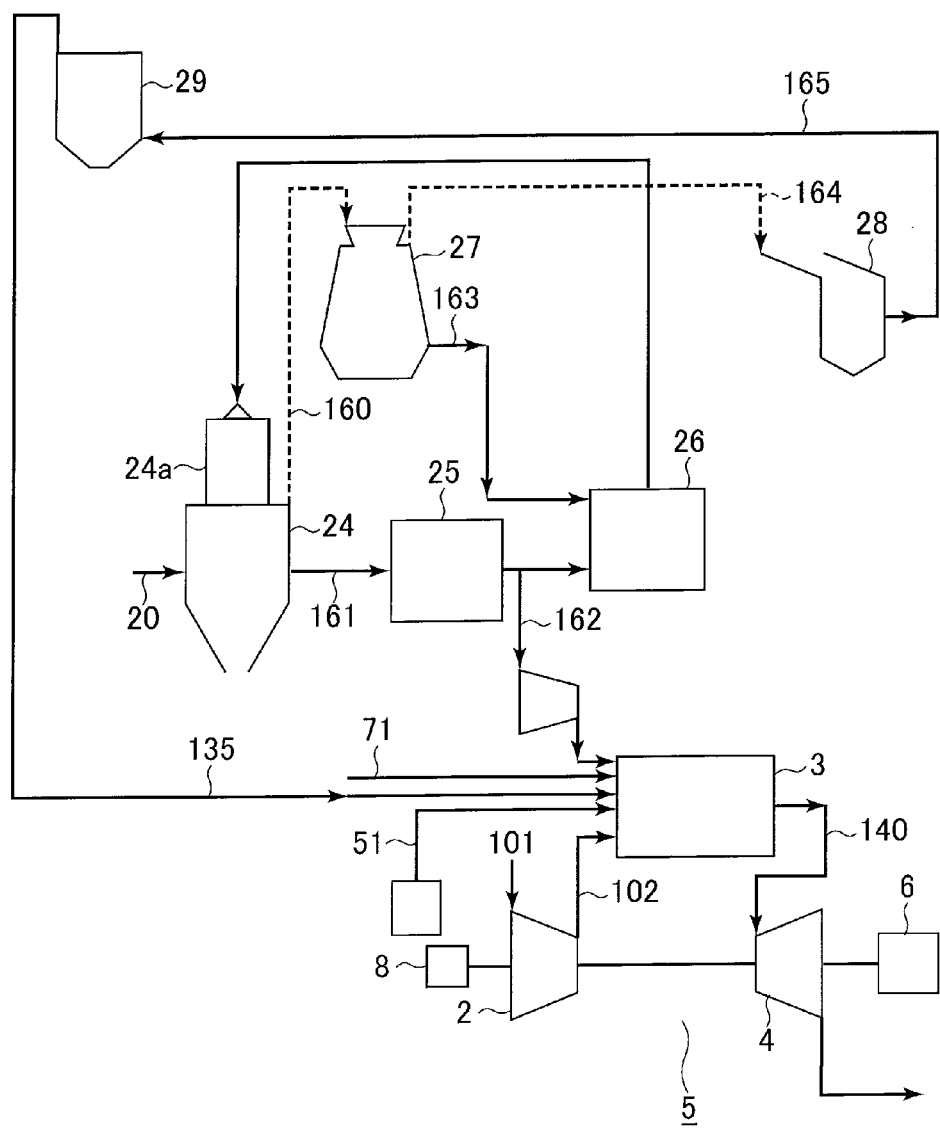
FIG. 10 is an outline diagram showing a system of a power plant according to the second embodiment.

FIG. 10 is an outline diagram showing a system of the plant according to the second embodiment. In the plant according to the present embodiment, COG 161 generated in a coke oven 24 is cleaned by a clean-up unit 25. After that, the COG 161 is mixed with blast furnace gas (BFG 163) generated in a blast furnace so that the calorific value of the fuel is controlled. The mixture is used as fuel for a heat source 24a, for dry distillation included in the coke oven 24. Linzer donawitz gas (LDG) generated in a converter furnace is stored in a gas holder (not shown). After that, the LDG is used as fuel for a boiler 29.

Figure 7:
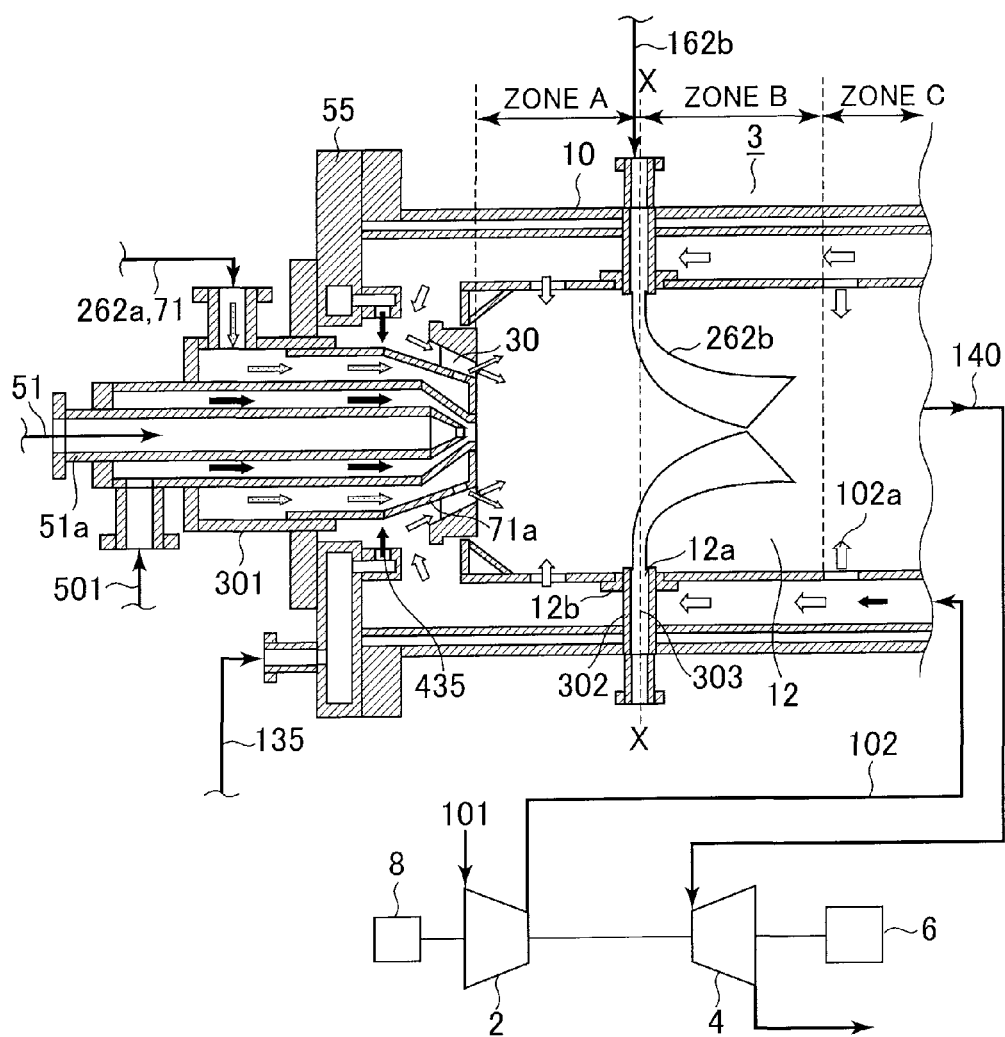
FIG. 7 is a diagram showing the structure of a combustor according to a second embodiment of the present invention.

FIG. 7 is an enlarged cross sectional view of a system of a gas turbine and a combustor. The combustor shown in FIG. 7 is similar to the combustor shown in FIG. 1. However, a gasifier is not provided in the plant according to the present embodiment. Thus, an air separation unit is not necessary, and it is difficult to supply nitrogen. Therefore, steam (or water) is injected into the combustor. A steam injection nozzle 435 extends along the outer circumference of the first fuel nozzle 301. The second fuel nozzles 302 are provided to supply second fuel 162b, into the combustor through the second fuel injection holes 12a provided in the liner wall surface of the combustion chamber 12. Air holes are provided on downstream of the second fuel nozzles 302. The air 102a, for lean combustion is supplied into the combustion chamber 12 through the air holes. The combustor has a structure that allows combustion to be performed in two stages.

Figure 8:
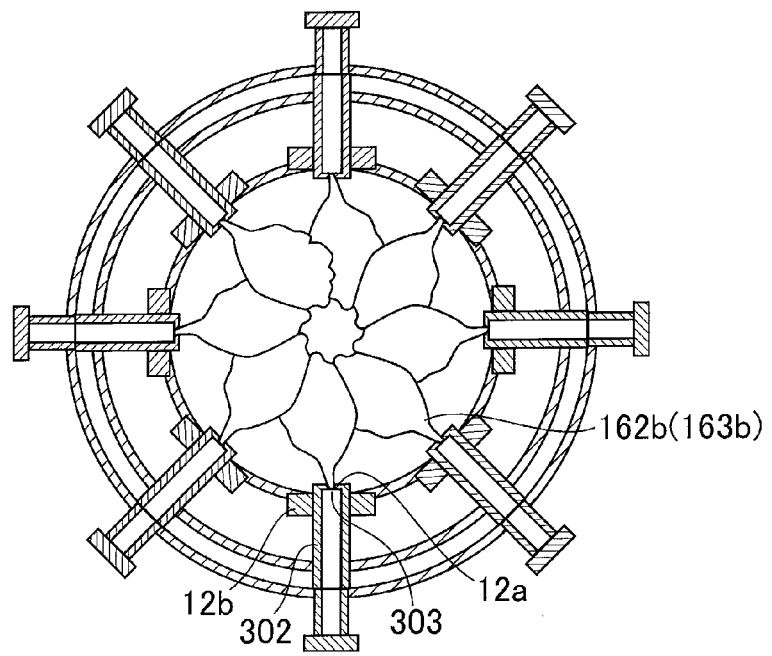
FIG. 8 is an outline cross sectional view of the combustor according to the second embodiment, taken along a line X-X of FIG. 7, the line X-X extending through second fuel injection holes provided in the combustor.

FIG. 8 is an outline cross sectional view of the combustor taken along a line X-X of FIG. 7, while the line X-X extends through the second fuel injection holes. In the present embodiment, the second fuel nozzles 302, which supply the second fuel 162b,, are provided on the liner wall surface of the combustor and extend through the outer casing 10 of the combustor. Second fuel nozzle capsules 12b, are provided to prevent air from flowing into the combustion chamber from the peripheries of the second fuel nozzles 302. This structure can further reduce the concentration of oxygen in the reduction zone B.

Figure 9:
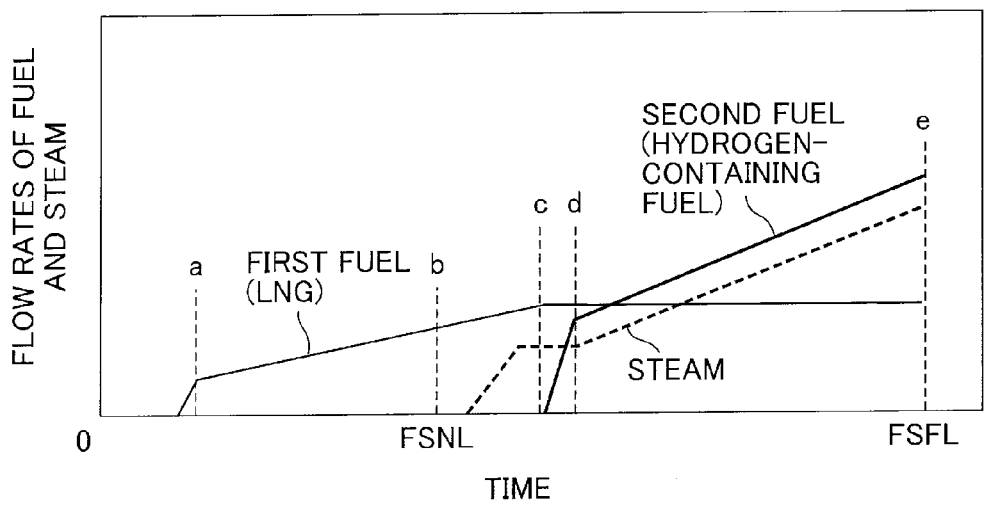
FIG. 9 is a diagram showing the flow rate of injected fuel and the flow rate of injected steam, with respect to a gas turbine load according to the second embodiment.

FIG. 9 shows a schedule of an operation of the gas turbine. In the present embodiment, LNG is used as high BTU fuel 71 for activation. The fuel that is to be supplied from the first fuel nozzle is not changed from the LNG 71 to the COG 162a. In the example shown in FIG. 9, the LNG 71 and the COG 162b, supplied from the second fuel nozzles 302 are mixed with each other and combusted, while the gas turbine is operated under a load that is increased from a low level to a rated level.

After ignition is performed using the LNG by the first fuel nozzle, the flow rate of the LNG 71 is increased. Then, the rotational rate of the gas turbine reaches the no-load rated rotational rate (at a time b). After the load is increased by the parallel operation of the power generator 6, steam 135 is supplied into the combustor to suppress an increase in the temperature of a local flame in the primary combustion zone and suppress generation of NOx in the primary combustion zone. Then, burned gas containing a low concentration of oxygen is generated (at a time c). After that, the COG 162b, is supplied as the second fuel into the zone B under a low load that is equal to a load applied at the time c. The NOx is reduced in the zone B by an oxidation reaction of hydrogen contained in the COG 162b. Thus, the concentration of the NOx is reduced in the zone B. Unburned gas, which is not burned in the zones A and B, can be burned in the zone C by supply of air.

After that, the flow rate of the second fuel 162b, is increased so that the load is increased. FIG. 9 shows an example in which as the load is increased, the flow rate of the steam to be injected is increased under a higher load than a partial load (applied at a time d) that is set for the fuel switching. The flow rate of the steam to be injected can be controlled on the basis of the NOx emission.

The present embodiment describes the example of the operation when the LNG is used for activation. Even when liquid fuel such as Bunker A is used for activation, the same effect can be obtained. In addition, even when the first fuel nozzle supplies the first fuel (COG 162a) containing hydrogen instead of the fuel for activation under a partial load condition, the same NOx reduction effect can be obtained.

The BFG 163 is also fuel containing hydrogen. The operation can be performed with the BFG 163 instead of the COG 162 used in the present embodiment. Also, the operation can be performed with the BFG 163 and the COG 162. Furthermore, the operation can be performed with a mixture of the BFG 163 and the COG 162.

According to the present embodiment, as described above, since an off gas that is generated in the steel plant and contains hydrogen is supplied to the gas turbine combustor for the hydrogen containing gas, the power plant suppresses NOx emission by means of a reduction reaction of hydrogen while ensuring high reliability of a diffusive combustion burner. Since electric power generated by the power plant is used for the entire plant, the efficiency of the entire plant can be improved.

[Third Embodiment]

The third embodiment describes an example of an operation of a power plant that uses, as fuel, an off gas generated in an oil refinery plant.

Figure 13:
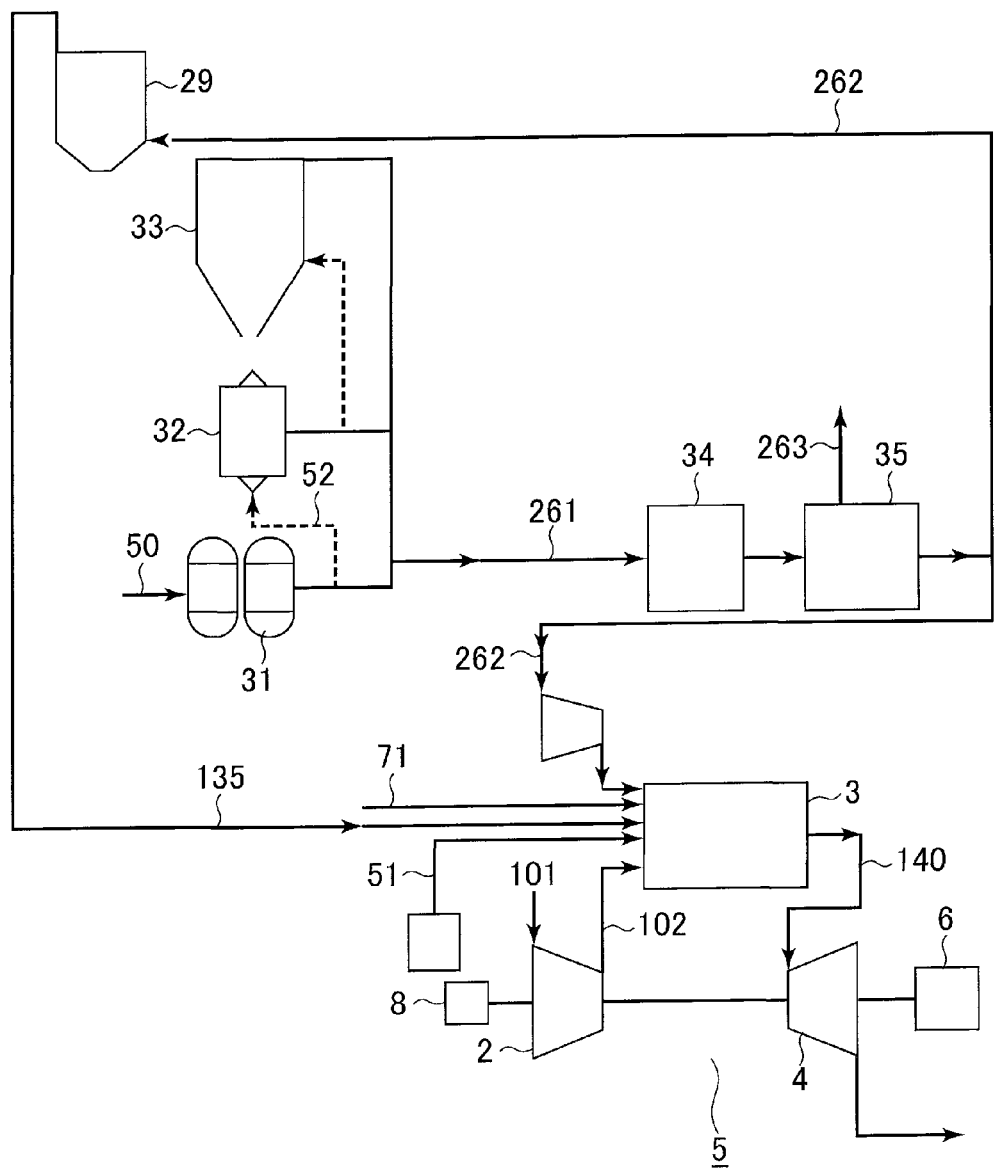
FIG. 13 is an outline diagram showing a system of a power plant according to the third embodiment.

FIG. 13 shows an outline configuration of the plant according to the present embodiment. In the plant according to the present embodiment, a precise distillation unit 31 separates oil 50 by distillation into naphtha or the like. In addition, a resolution unit 32 develops the naphtha into various petrochemical products. A reforming unit 33 reforms generated gas. Off gas containing hydrogen is generated in each of the distillation unit 31, the resolution unit 32, and the reforming unit 33.

In the plant according to the present embodiment, the raw off gas is temporarily stored in a gas holder 34. A clean-up unit 35 performs desulfurization and the like on the gas. Chemical species containing three or more carbon atoms are extracted as liquefied propane gas (LPG) 263. Remaining hydrogen containing gas 262 is used as fuel for the gas turbine 5 and fuel for the boiler 29.

Figure 11:
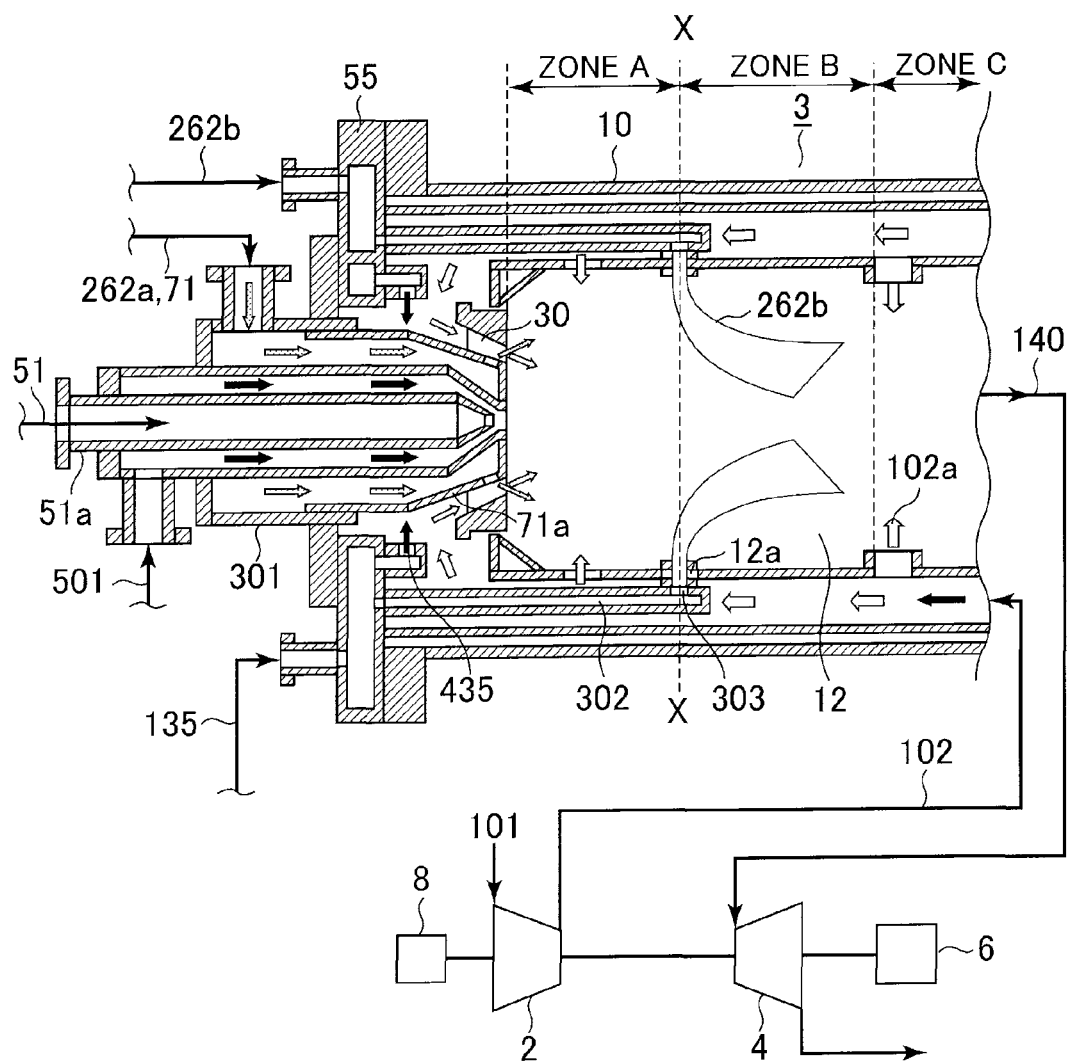
FIG. 11 is a diagram showing the structure of a combustor according to a third embodiment of the present invention.

FIG. 11 is an enlarged cross sectional view of a system of the gas turbine and the combustor. The combustor shown in FIG. 11 is similar to the combustor shown in FIG. 7. Steam is injected into the combustor shown in FIG. 11. The steam injection nozzle 435 extends along the outer circumference of the first fuel nozzle 301. In addition, the second fuel nozzles 302 supply the second fuel 262b, (or 263b) into the combustor through the second fuel injection holes 12a, provided in the liner wall surface of the combustion chamber 12. The air holes are provided on downstream of the second fuel nozzles 302. The air 102a, for lean combustion is supplied through the air holes into the combustion chamber 12. The combustor has a structure that allows combustion to be performed in two stages.

Figure 12:
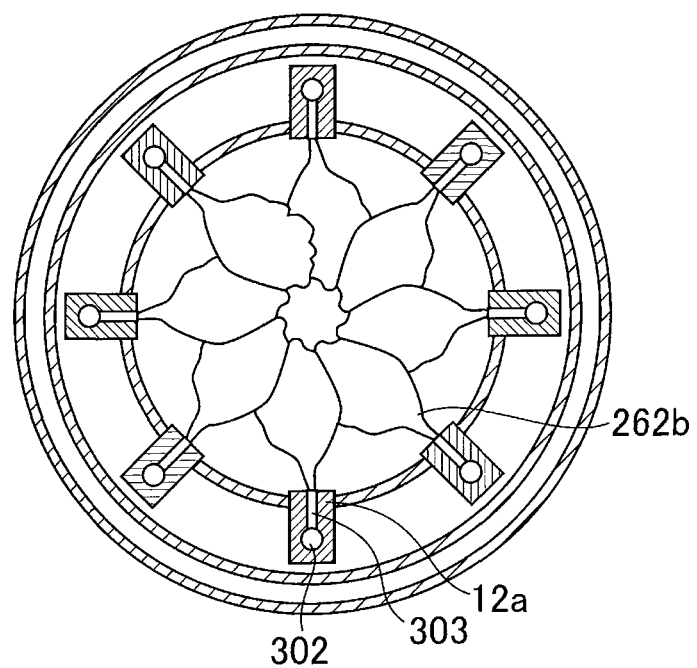
FIG. 12 is an outline cross sectional view of the combustor according to the third embodiment, taken along a line X-X of FIG. 11, the line X-X extending through second fuel injection holes provided in the combustor.

FIG. 12 is an outline cross sectional view of the combustor 3 taken along a line X-X of FIG. 11, while the line X-X extends through the second fuel injection holes. In the present embodiment, the second fuel nozzles 302 that supply the second fuel 262b, (or 263b) are directly attached to the combustion chamber 12 and connected to a second fuel manifold of the end cover 55 via a flexible tube. This structure further reduces the concentration of oxygen in the reduction zone B.

In addition, since thermal stretching of the liner wall surface of the combustion chamber and thermal stretching of the second fuel nozzles are absorbed, the second fuel can be reliably supplied into the combustion chamber 12 and thermal stretching of the flexible tube itself does not cause damage of the second fuel nozzles and the like.

Cylindrical guide parts (scoops) are provided for introduction holes through which the air 102 for lean combustion is introduced so that the air 102a, for lean combustion passes through the burned gas that has flowed from the zone B and easily reaches the central portion of the combustor. In this configuration, the unburned gas that is not burned in the zones A and B, and the air 102a, for lean combustion can be rapidly mixed with each other. Although the scoops are provided for the introduction holes in the present embodiment, two staged air holes configuration can be provided instead. The introduction holes through which the air for lean combustion is introduced may be arranged in upper steam stages in the axial direction of the combustor to assist the air 102a, for lean combustion to pass through the burned gas so that the air 102a, for lean combustion reaches the central portion of the combustor.

According to the present embodiment, since the off gas containing hydrogen that is generated in a petroleum refinery process is supplied into the gas turbine combustor for fuel containing hydrogen, the power plant suppresses NOx emission by means of the reduction reaction of hydrogen while ensuring high reliability of the diffusive combustion burner. Since electric power generated by the power plant is used for the entire plant, the efficiency of the entire plant can be improved.

As described above, the combustor according to each of the embodiments includes: the combustion chamber 12 that burns fuel with air; and the first fuel nozzle 301 that supplies the fuel into the combustion chamber 12 from the upstream of the combustion chamber 12. Also, the combustor according to each of the embodiments includes the second fuel injection holes 12a, formed in the liner wall surface of the combustion chamber 12. The second fuel injection holes 12a, is used to supply the hydrogen-containing gas into the combustion chamber 12.

In the combustor according to each of the embodiments, the NOx that is generated by the combustion of the fuel supplied from the first fuel nozzle 301 can be reduced by the fuel containing hydrogen and serving as a reductant, which is supplied through the second fuel injection holes 12a. Thus, the amount of NOx that is emitted from the combustor can be reduced. This reduction reaction noticeably occurs in the aforementioned zone B.

In addition, the combustor according to each of the embodiments includes the section that reduces the oxygen concentration on the upstream side of the second fuel injection holes in the direction of the flow of the burned gas. Thus, the fuel can be burned under a fuel rich condition in the zone A that is located on the upstream side of the second fuel injection holes in the direction of the flow of the burned gas. Since the fuel is burned under the fuel rich condition, the amount of remaining oxygen can be noticeably reduced. Since the amount of the remaining oxygen is small, hydrogen contained in the second fuel injected into the zone B reacts with oxygen atoms contained in the NOx. Thus, the NOx generated in the zone A can be reduced in the zone B.

The small amount of the remaining oxygen means that the amount of oxygen present in a downstream-side zone of the zone A is equal to or less than 10% of an oxygen amount that corresponds to the theoretical fuel-air ratio. It is preferable that the amount of the oxygen present in the downstream-side zone of the zone A be equal to or less than 1% of the oxygen amount that corresponds to the theoretical fuel-air ratio. When the amount of the oxygen is substantially equal to 0% of the oxygen amount that corresponds to the theoretical fuel-air ratio, the highest effect can be obtained.

In the combustor according to each of the embodiments, the sizes of the air holes are small so that the absolute amount of air to be supplied into the zone A is set to be small. Even in this configuration, the amount of the remaining oxygen present in the downstream-side zone of the zone A can be small.

The combustor according to the first embodiment includes the nitrogen injection nozzle 430 that reduces the oxygen concentration and serves as inert gas injection sections. Since nitrogen that is an inert gas is injected from the nitrogen injection nozzle 430, the oxygen concentration is reduced and the temperature of a local flame can be reduced. Thus, the nitrogen injection nozzle 430 can suppresses generation of NOx at the head portion of the combustor.

In the combustor according to the first embodiment, nitrogen is injected, as a mixture of the nitrogen and air, from the nitrogen injection nozzle 430 into the combustion chamber 12. Thus, it is not necessary that the combustor have a complex structure.

The gas obtained by burning the fuel under the fuel rich condition flows into the zone B. In the zone B, the hydrogen-containing gas containing is injected into the gas. Thus, the aforementioned reduction reaction occurs so that the amount of the NOx is reduced. Inert gas is a gas that does not provide an effect of promoting combustion of fuel. The inert gas includes steam, in addition to nitrogen.

The combustor according to each of the embodiments includes the air holes formed downstream of the second fuel injection holes 12a, in the direction of the flow of the burned gas. The air holes are used to supply the air 102a for lean combustion into the combustion chamber 12. Since the combustor includes the air holes, the zone C can be formed. Specifically, the unburned part of fuel can be burned by supplying the air after the NOx is reduced by the supply of the hydrogen-containing gas. Thus, the fuel that is not burned in the zone B can be stably burned under the condition that the amount of generated NOx is small.

As described above, the combustor according to each of the embodiments uses the diffusive combustion system. A reliable operation can be ensured regardless of the type of the hydrogen-containing gas. In addition, the combustor according to each of the embodiments includes the configuration that suppresses an increase in the temperature of a local flame and reduces the amount of generated NOx. The combustor can perform a low NOx operation although the combustor uses the diffusive combustion system.

What is claimed is:

1. A combustor comprising:
   a combustion chamber that burns fuel with air;
   a first fuel nozzle that supplies the fuel and air into the combustion chamber from upstream of the combustion chamber through different paths, the first nozzle constituting a burner that uses a diffusive combustion system;
   a second fuel injection hole formed in a liner wall surface of the combustion chamber downstream of the first fuel nozzle in a direction of flow of a burned gas, the second fuel injection hole being used to supply a hydrogen-containing gas into the combustion chamber;
   an air hole formed downstream of the second fuel injection hole in the direction of flow of the burned gas, the air hole being used to supply air into the combustion chamber;
   a primary combustion zone extending from the first fuel nozzle to a boundary very close to and on an upstream side of the second fuel injection hole, the primary combustion zone used to generate the burned gas containing oxygen with a low concentration by combustion of the fuel supplied from the first fuel nozzle under a fuel rich condition;
   a reduction zone extending from the second fuel injection hole to a boundary very close to and on the upstream side of the air hole, the reduction zone used to reduce NOx contained in the burned gas containing the low concentration of oxygen from the primary combustion zone by the hydrogen contained in the hydrogen-containing gas; and
   a secondary combustion zone extending from the air hole to an outlet of the combustion chamber, the secondary combustion zone used to combust unburned fuel contained in the burned gas that flows from the reduction zone and the air injected from the air hole under a fuel lean condition.

2. A combustor comprising:
   a combustion chamber that burns fuel with air;
   a first fuel nozzle that supplies the fuel and air into the combustion chamber from upstream of the combustion chamber through different paths, the first nozzle constituting a burner that uses a diffusive combustion system;
   a second fuel injection hole formed in a liner wall surface of the combustion chamber downstream of the first fuel nozzle in a direction of flow of a burned gas, a reductant supplied through the second fuel injection hole into the combustion chamber, the reductant reducing NOx that is generated by the combustion of the fuel supplied from the first fuel nozzle;
   an air hole formed downstream of the second fuel injection hole in the direction of flow of the burned gas, the air hole being used to supply air into the combustion chamber;
   a primary combustion zone extending from the first fuel nozzle to a boundary very close to and on the upstream side of the second fuel injection hole, the primary combustion zone used to generate the burned gas containing oxygen with a low concentration by the combustion of the fuel supplied from the first fuel nozzle under a fuel rich condition;
   a reduction zone extending from the second fuel injection hole to a boundary very close to and on the upstream side of the air hole, the reduction zone used to reduce the NOx contained in the burned gas containing the low concentration of oxygen from the primary zone by the reductant; and
   a secondary combustion zone extending from the air hole to an outlet of the combustion chamber, the secondary combustion zone used to combust unburned fuel contained in the burned gas that flows from the reduction zone and the air injected from the air hole under a fuel lean condition.

3. The combustor according to claim 1, further comprising means for reducing oxygen concentration on an upstream side of the second fuel injection hole in the direction of flow of the burned gas.

4. The combustor according to claim 3, further comprising means for injecting inert gas to reduce the oxygen concentration.

5. The combustor according to claim 4, wherein the inert gas injection means is adapted to inject a mixture of the inert gas and air into the combustion chamber.

6. A power plant comprising:

the combustor according to claim 1;

an air compressor that supplies compressed air into the combustor;

a turbine that is driven by a burned gas generated by the combustor;

a generator that generates electric power by means of a driving force generated by the turbine; and means for increasing hydrogen concentration in fuel;

wherein fuel whose hydrogen concentration has been increased by the hydrogen concentration increasing means is supplied to the second fuel injection hole of the combustor.

7. The power plant according to claim 6, wherein the hydrogen concentration increasing means uses a shift reaction of carbonate with steam.

8. The power plant according to claim 6, wherein the hydrogen-containing gas is a gas fuel generated in a steel making process.

9. The power plant according to claim 6, wherein the hydrogen-containing gas is a gas refined by gasifying coal with oxygen.

10. The power plant according to claim 6, wherein the hydrogen-containing gas is an off gas generated in a petroleum refinery process.

11. A method for combusting air and fuel to form a burned gas, comprising the steps of:

generating the burned gas containing oxygen with a low concentration by diffusive combustion of the fuel and the air under a fuel rich condition;

supplying hydrogen-containing gas to the burned gas containing oxygen with a low concentration to decrease NOx generated by combustion of the air and the fuel by subjecting the NOx to a reduction reaction; and supplying the air to the burned gas containing the reduced NOx by the supply of the hydrogen-containing gas to combust unburned fuel contained in the burned gas under a fuel lean condition.

12. A method for operating the combustor according to claim 1, comprising the step of controlling at least one of the flow rate of fuel to be supplied from the first fuel nozzle and the flow rate of fuel to be supplied from a second fuel nozzle on the basis of at least one of the concentration of the hydrogen contained in the gas and the concentration of NOx in the combustion chamber.

* * * * *